Patented Apr. 8, 1930

1,754,129

UNITED STATES PATENT OFFICE

JOHN T. TRAVERS AND OLIVER M. URBAIN, OF COLUMBUS, OHIO, ASSIGNORS, BY DIRECT AND MESNE ASSIGNMENTS, TO THE OHIO SANITARY ENGINEERING CORPORATION, OF COLUMBUS, OHIO, A CORPORATION OF OHIO

PROCESS OF WATER PURIFICATION

No Drawing. Application filed July 13, 1928. Serial No. 292,587.

This invention relates to a process of water purification and is of wide adaptation. It may be employed for treating drinking water but is especially well adapted for the purification of putrescible liquids such as sewage and industrial waste.

In the treatment of drinking water it is the purpose to sterilize the water by destroying all bacteria therein. In the treatment of putrescible liquids it is the purpose to render such liquids non-putrescent and to completely eliminate the biochemical oxygen demand thereof, to thus prevent pollution of streams or bodies of water normally receiving such putrescible liquids.

Heretofore it has been the practice to sterilize drinking water by chlorination. The chlorine acts to release nascent oxygen in the water to destroy the bacteria in accordance with the following reactions:

$$Cl_2 + H_2O = HCl + HOCl$$

The hypochlorous acid formed then breaks down yielding hydrochloric acid and nascent oxygen as follows:

$$2HOCl = 2HCl + O_2$$

The oxygen thus released is at the instant of birth known as nascent oxygen. If water containing bacteria is treated with chlorine in sufficient amount, the entire bacterial content of the water may be destroyed. The process of chlorination is an expensive one and requires the employment of expensive chlorinators. Furthermore, since such putrescible liquors as sewage and industrial waste contain in addition to bacteria varying quantities of extremely putrescible organic matter having a high biochemical oxygen demand, it is evident that to treat such liquors with chlorine in amounts adequate to release in the water sufficient nascent oxygen to satisfy the oxygen demand of the liquor would be an economic impossibility.

The present invention in its simplest form, contemplates the provision of an extremely economical process for releasing nascent oxygen in water to sterilize and purify the same. The process is one in which the bacteria and putrescible content of the water assists in the release of the nascent oxygen.

In the U. S. Patent No. 1,672,587, there is described a process for treating liquids containing putrescible matter in colloidal form with a suitable electrolyte, the pH of the solution being such as to insure that the colloids will be completely negatively charged. In the process described in the above patent there occurs a release of nascent oxygen as a result of the union of the negative ion of the electrolyte producing material with the water of the solution.

For example, when $CaSO_4$ is used as the electrolyte it dissociates as follows:—

$$CaSO_4 = Ca + SO_4$$

The positive Ca ions are adsorbed by the negative colloids, thus throwing the solution out of equilibrium. To restore the equilibrium of the solution the negative $SO_4$ ion unites with the water of the solution as follows:—

$$2SO_4 + 2H_2O = 2H_2SO_4 + O_2$$

It has been determined that the nascent oxygen producible in the above manner when treating putrescible liquids, such as municipal sewage, normally constitutes only about one-third of that required to satisfy the entire biochemical oxygen demand of the liquid under treatment. It will be understood that this statement is not in derogation of the process disclosed in Patent No. 1,672,587 since that process contemplates the removal of the putrescible content from the liquor by a coagulant.

It will be apparent that if sufficient nascent oxygen can be released in the liquor to satisfy its biochemical oxygen demand, the liquor will be rendered non-putrescent and will not pollute the receiving waters even though no filtration or coagulation is resorted to.

So long as the colloidal content of the liquor is putrescible, the biochemical oxygen demand will, of course, increase in direct proportion to the increase in colloidal matter. However, if non-putrescible colloids are incorporated in the liquor, it will be evident that the biochemical oxygen demand is not thereby increased. Reactions effecting the precipitation of such non-putrescible colloids will, however, result in the release of additional quantities of nascent oxygen by freeing negative ions of the electrolyte for union with the water of the solution.

If a sufficient quantity of non-putrescible colloids is incorporated in the liquor it will be possible to release sufficient nascent oxygen in the liquor to completely satisfy its biochemical oxygen demand.

The present process comprises the control of the quantity and character of the colloidal content of the liquor treated to thereby permit a release of nascent oxygen in an amount adequate to completely supply the biochemical oxygen demand of the liquor by oxidizing the entire putrescible content of the liquor.

In treating liquids containing colloids with electrolytes it is found that nascent oxygen is released in about the proportion of 2 to 3, i. e., two parts per million of nascent oxygen will be released for each three parts per million of colloidal matter in the liquor. The biochemical oxygen demand of the putrescible content of polluted liquors is found, however, to be in substantially the proportion of 2 parts per million of dissolved oxygen to each 1 part per million of putrescible matter. It is at once evident that so long as the entire colloidal content of the liquor is putrescible, it will be impossible to release nascent oxygen in an amount adequate to satisfy the demand and oxidize the putrescible content of the liquor.

As above pointed out, the putrescible colloids will, when the solution containing the same is treated with an electrolyte as, for example, $CaSO_4$ or other electrolytes enumerated in Patent No. 1,672,587, release nascent oxygen adequate to satisfy about one-third of the biochemical oxygen demand of the liquor. When non-putrescible colloids are incorporated in the liquor, they do not increase the biochemical oxygen demand but they do adsorb positive ions of the electrolyte and thereby release negative ions which unite with the water of the solution, resulting in the liberation of additional quantities of nascent oxygen. In this way non-putrescible colloids may be used to bring about a release of nascent oxygen in the liquor adequate to completely satisfy the biochemical oxygen demand.

Since the ratio of released nascent oxygen to colloidal content is in the proportion of 2 to 3 and since one-third of the biochemical oxygen demand is satisfied as a result of the presence in the liquid of the putrescible colloids, it follows that the non-putrescible colloids must be incorporated in the liquor in an amount adequate to release nascent oxygen sufficient to supply two-thirds of the biochemical oxygen demand.

In practice it has been found desirable to incorporate in the liquid at least one and one half times as much non-putrescible colloidal matter in parts per million as the ten day biochemical oxygen demand of the liquor treated. In this way there is released enough nascent oxygen to satisfy the complete oxygen demand of the liquor, including that due to the presence of putrescible matter in true solution and suspension.

It will be appreciated that the colloidal matter added must be inert in so far as putrifaction is concerned and should have no oxygen demand. The plastic clays and materials such as a bentonite and the colloidal marls may be advantageously employed. The colloidal matter content of the material used may advantageously be increased by passing the same through a suitable colloid mill.

It will be appreciated that the present process presupposes that the pH of the solution will be so controlled as to effect a complete negative charging of the colloids in the liquor treated. This may be done by incorporation in the liquor along with the inert colloidal matter the proper quantity of calcium hydroxide. The electrolyte is added and the liquor agitated. If desired, the treated liquor may be passed to a settling zone to permit precipitation of the heavier suspended matter.

From the foregoing it will be evident that the process enables the release in the water of the solution treated of nascent oxygen in amounts adequate to oxidize the putrescible content of the sewage or waste treated.

In the treatment of drinking water, it will be appreciated that only a small quantity of inert colloidal matter and electrolyte producing material will be required. The treatment of drinking water by this process is more economical than the conventional chlorination processes, avoids bad tastes resulting from excessive chlorination, and furthermore the color producing substances in the water are adsorbed by the added colloidal clay.

We claim:—

1. A process for purifying water comprising incorporating in the water colloidal matter having no biochemical oxygen demand, raising the hydroxyl ion concentration of the solution to cause the colloids to carry a complete negative charge, and adding an electrolyte characterized by its capacity to dissociate and release positive ions for adsorption by the negatively charged colloids and negative ions for union with the water of the solution to effect a release of nascent oxygen in an amount adequate to satisfy the biochemical oxygen demand of the water.

2. A process for purifying polluted liquids comprising incorporating in the liquid non-putrescible colloidal matter, calcium hydroxide and an electrolyte, the calcium hydroxide being added in an amount adequate to increase the hydroxyl ion concentration of the solution to that degree which will cause the non-putrescible colloids to carry a complete negative charge.

3. A process for purifying polluted liquids comprising incorporating in the liquid non-putrescible colloidal matter, calcium hydroxide and an electrolyte, the non-putrescible colloidal matter being added in an amount adequate to adsorb positive ions of the electrolyte and release negative ions sufficient when united with the water of the solution to liberate enough nascent oxygen to completely oxidize the putrescible content of the polluted liquid.

4. A process for purifying polluted liquids comprising incorporating in the liquid non-putrescible colloidal matter, calcium hydroxide and an electrolyte, the calcium hydroxide being added in an amount adequate to increase the hydroxyl ion concentration of the solution to that degree which will cause the non-putrescible colloids to carry a complete negative charge, the non-putrescible colloidal matter being added in an amount adequate to adsorb positive ions of the electrolyte and release negative ions sufficient when united with the water of the solution to liberate enough nascent oxygen to completely oxidize the putrescible content of the polluted liquid.

5. A method for releasing nascent oxygen in water to purify the same, comprising incorporating in the water non-putrescible colloidal matter and an electrolyte, and maintaining the hydroxyl ion concentration of the solution such that the non-putrescible colloids in the water will carry a complete negative charge.

6. A process for purifying and sterilizing polluted liquids or drinking water supplies, comprising incorporating in the liquid non-putrescible colloidal matter, calcium hydroxide and an electrolyte, the non-putrescible colloidal material being added in an amount adequate to adsorb positive ions of the electrolyte and release negative ions sufficient when united with the water of the solution to liberate enough nascent oxygen to completely oxidize the putrescible content of the polluted liquid or drinking water supply and destroy or exterminate the bacteria contained therein.

JOHN T. TRAVERS.
OLIVER M. URBAIN.